US006916411B2

(12) United States Patent
Cisar et al.

(10) Patent No.: US 6,916,411 B2
(45) Date of Patent: Jul. 12, 2005

(54) METHOD FOR ELECTRICALLY CONTROLLED DEMOLITION OF CONCRETE

(75) Inventors: Alan Cisar, Cypress, TX (US); Adrian Denvir, College Station, TX (US); Dalibor Hodko, College Station, TX (US); Kyle Uselton, College Station, TX (US); Amanda Campbell, College Station, TX (US)

(73) Assignee: Lynntech, Inc., College Station, TX (US)

( * ) Notice: Subject to any disclaimer, the term of this patent is extended or adjusted under 35 U.S.C. 154(b) by 565 days.

(21) Appl. No.: 10/081,145

(22) Filed: Feb. 22, 2002

(65) Prior Publication Data

US 2003/0159931 A1 Aug. 28, 2003

(51) Int. Cl.[7] .......... B01D 61/56

(52) U.S. Cl. .......... 204/515; 204/648; 204/230.2; 204/230.6; 205/734; 205/766

(58) Field of Search .......... 204/515, 648, 204/230.2, 230.6; 205/734, 766

(56) References Cited

U.S. PATENT DOCUMENTS

| | | | |
|---|---|---|---|
| 4,305,800 | A | 12/1981 | Christenson |
| 4,600,486 | A | 7/1986 | Oppitz |
| 4,755,305 | A | 7/1988 | Fremont et al. |
| 4,927,503 | A | 5/1990 | Polly |
| 5,015,351 | A | 5/1991 | Miller |
| 5,071,579 | A | 12/1991 | Johnston et al. |
| 5,092,923 | A | 3/1992 | Dillard et al. |
| 5,240,570 | A | 8/1993 | Chang et al. |
| 5,368,709 | A | 11/1994 | Utklev |
| 5,458,747 | A | 10/1995 | Marks et al. |
| 5,616,235 | A | 4/1997 | Acar et al. |
| 5,755,945 | A | 5/1998 | Kristiansen |

FOREIGN PATENT DOCUMENTS

| | | |
|---|---|---|
| JP | 62259052 | 11/1987 |
| JP | 63315941 | 12/1998 |
| JP | 11324349 | 11/1999 |

OTHER PUBLICATIONS

"Fatigue Performance of Concrete Beams Strengthened with CFRP Plates" by Richard Andrew Barnes and Geoffrey Charles Mays; Journal of Composites For Construction/ May/1999/pp. 63–72.

"Using Stainless Steels as Long–lasting Rebar Material" Materials Performance v 38 N 5 1999. pp. 72–76.

"Transportation" IEEE Spectrum vol. 35, No 1, Jan. 1998, pp. 84–89.

Durability of Building Materials and Components, Proceedings of the Fifth International Conference held in Brighton, UK, Nov. 7–9, 1990, Edited by J.M. Baker, P.J. Nixon, Majurnadar, & Davies, pp. 5–16.

Journal of the Structural Division, Physical Model for Steel Corrosion in Concrete Sea Structures–Application By Zdeněk P. Bažant, M. ASCE, Jun. 1979, pp. 1155–1167.

5.8 The Residual Service Life Prediction of RC Structures, X. M. Wang and H.Y. Zhao, Department of Civil Engineering, Tsinghua University, Beijing, China, pp. 1107–1113.

"Experimental Service Life Prediction of Rebar–Corroded Reinforced Concrete Structure"; ACI Materials Journal/ Jul.–Aug. 1997; pp. 311–316.

"Demonstration of Electro–Osmotic Pulse Technology for Groundwater Intrusion Control in Concrete Structures"; FEAP Technical Report 98/68; Apr. 1998; pp. 1–44.

Industrial Electrochemistry, Second Edition; authors: Derek Pletcher and Frank C. Walsh; pp. 489–509.

*Primary Examiner*—Jill Warden
*Assistant Examiner*—Sam P. Siefke
(74) *Attorney, Agent, or Firm*—Streets & Steele; Jeffrey L. Streets; Frank J. Campigotto

(57) ABSTRACT

A method to demolish concrete that comprises electrically connecting rebar disposed within the concrete to a power supply, electrically connecting a counter electrode within electro-osmotic communication of the concrete to a power supply, and externally providing electrolyte as supplemental moisture for the concrete. An electric field is created within the concrete and causes water moisture to migrate toward the rebar thereby expediting the corrosion thereof. The corrosion of the rebar generates iron oxides, which because of their greater volume, cause areas of localized pressure within the concrete. As the corrosion process proceeds, an accumulation of oxides increases the localized pressure to cause cracking within the concrete.

10 Claims, 3 Drawing Sheets

METHOD FOR ELECTRICALLY CONTROLLED DEMOLITION OF CONCRETE

FIELD OF THE INVENTION

The present invention relates to methods for demolition of reinforced concrete structures.

DESCRIPTION OF RELATED ART

Reinforced concrete is an essential building block for structures of various kinds, i.e. buildings, bridges, parking garages, even our homes. However, concrete structures, including reinforced concrete structures, crack due to time, stress, and load. These small cracks (microcracks) allow penetration of corroding agents to contact the reinforcement bar (rebar) inside the concrete. The presence of these corroding agents speeds up the corrosion process of the rebar. The oxides produced by the oxidation of the rebar build up over time and cause the existing microcracks to expand and form new cracks. These new cracks increase the level of corroding agents in contact with the rebar to speed up the corrosion process even more. As this process continues, the oxidation products continue to build up and lead to the breaking up (spalling) of concrete surrounding the rebar. Thus, over a period of time, a vast number of reinforced concrete structures deteriorate. When these structures deteriorate and are no longer useful or safe, it is often more economical to demolish the structures rather than restore the structures.

There are many available methods of demolition, but they are riddled with problems. One demolition method involves the use of explosives. However, because structures of today are being built to withstand higher pressures and more loading, more and more explosives must be used in order to accomplish the demolition. Furthermore, the use of explosives poses health and safety hazards to the public via the broadcasting of dust and debris over a wide range of area. First, the use of explosives coats the demolished material with hazardous chemicals of which the explosives are made and creates hazardous waste. According to EPA regulations, this waste must be disposed of carefully. Second, the use of explosives creates enormous dust clouds over a large area. This dust is very fine and can seriously irritate the human pulmonary system, and the dust may also contain other harmful chemicals such as asbestos. Third, the use of explosives prevents the demolished concrete from being recycled. The inability to recycle the concrete increases project costs and raises further environmental concerns.

Another method of demolition involves the use of heavy equipment, i.e. the wrecking ball or compressed air powered hammers. While not as immediately destructive as explosives, the use of heavy equipment is cumbersome and poses a safety hazard. First, the use of heavy equipment is extremely noisy. Demolition utilizing heavy equipment could easily disrupt a residential neighborhood or downtown area. Second, the use of heavy equipment is space consuming. Regardless of where the demolition occurs, the space required to get the wrecking ball in place is tremendous. Third, the use of heavy equipment, as with explosives, creates large amounts of dust. Unfortunately, this dust may contain hazardous materials and pose a serious health threat.

A further demolition method disclosed by Japanese Patent Abstract JP11324349, utilizes an electric current to accelerate the degradation of reinforced concrete. This method of demolition requires that the reinforced concrete be drilled in several locations to allow the placement of localized cathodes and sealing material within the holes. However, the installation of embedded cathodes requires drilling the concrete structure for installation, wherein the drilling process creates dust and increases the difficulty of the demolition process.

What is needed is a method of demolishing concrete that is environmentally friendly and allows greater design flexibility. In addition, a method is needed that does not create large amounts of dust, does not create high levels of noise, and does not release harmful chemicals into the environment.

SUMMARY OF THE INVENTION

The present invention provides a method for the demolition of reinforced concrete comprising electrically connecting a first power supply terminal to an iron containing metal structure disposed within the concrete, then electrically connecting a counter electrode, disposed in electro-osmotic communication with the concrete, to a second power supply terminal such that the potential in the counter electrode is different from that of the iron containing metal structure, and then providing an external electrolyte to supplement the moisture within the concrete. The counter electrode utilized can be composed of an iridium coated titanium mesh or any other conductive material, so long as the counter electrode is in electro-osmotic communication with the concrete. Electro-osmotic communication with the concrete can be achieved using counter electrodes that are internal to the concrete, external to the concrete, or a combination thereof. In addition, the method can be altered to predicate a variation in the reaction by: varying the amperage supplied from the power supply, or varying the power supply, or varying the time the current is applied to the anode and cathode. Also, the method may further comprise alternating the polarity of the rebar and the counter electrode.

The present invention can be embodied in an apparatus for demolishing reinforced concrete comprising a power supply; a counter electrode sheet disposable coterminously with all external surfaces of the concrete; a means for connecting rebar disposed within the concrete to the power supply; a means for connecting the counter electrode to the power supply terminal; and a means for periodically reversing the polarity of the power supply.

DETAILED DESCRIPTION OF THE INVENTION

Figure 1:
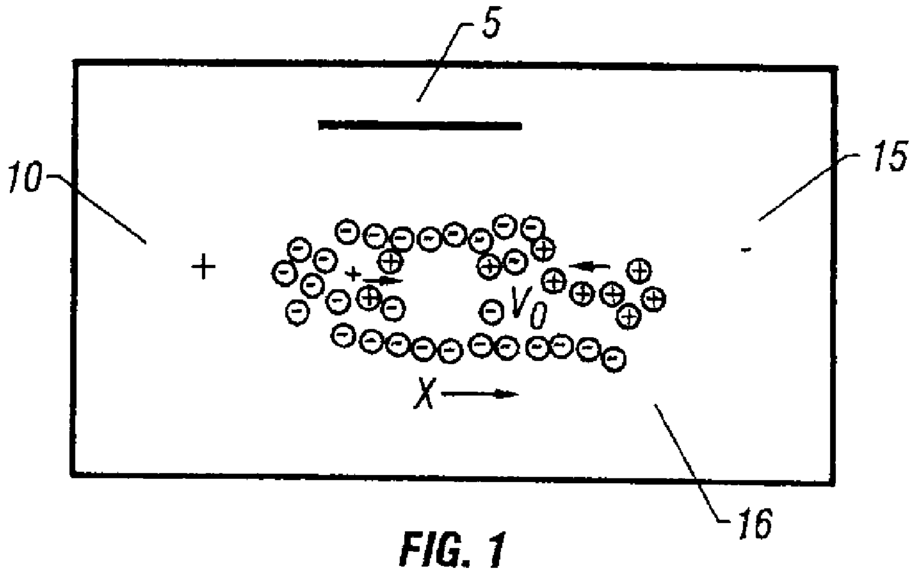
FIG. 1 is a schematic diagram illustrating the migration of ions through concrete in response to the application of an electric field.

The present invention utilizes an electric field to move moisture through a concrete structure to rebar originally disposed within and forming part of the concrete structure in order to expedite the oxidation of the rebar. The moisture is provided either from the moisture already present within the concrete structure or with an externally applied electrolyte or a combination thereof, and the electric field is established by connecting a terminal on a power supply to an exposed portion of rebar within the concrete and an opposite polarity terminal to a counter electrode. The application of the electric field causes ions within the moisture to move either to the anode or cathode depending on the polarity of the ion. Thus, the electric field causes the migration of oppositely charged ions toward the rebar. Furthermore, this migration expedites the oxidation process of the rebar and in turn diminishes the structural integrity of the rebar and causes a build up of oxides around the rebar. The build up of oxides around the rebar, leads to stress fractures within the concrete structure.

The iron containing metal structure within the concrete is typically composed of iron, carbon steel, or other iron-containing alloys or mixtures. In industry, the iron containing metal structure is typically referred to as reinforcement bar or rebar. The particular shape or configuration of the rebar is not critical for the operation of the invention, but the rebar must be susceptible to oxidation and must be able to produce iron oxides when corroded.

The counter electrode is composed of an electrically conductive member, preferably a sheet, that is disposed on the concrete in electro-osmotic communication with the concrete. The counter electrode is in electro-osmotic communication with the concrete when the counter electrode supports a sufficient electric field within the concrete to induce the migration of external moisture into the concrete, or induces the migration of internal moisture within the concrete. Because the counter electrode is placed in electro-osmotic communication with the concrete and not necessarily embedded within the concrete, the invention provides greater flexibility in the design and placement of the counter electrode and demolition of larger areas of concrete can be accomplished. The demolition of larger areas of concrete is derived from the fact that the area of concrete does not need to be perforated a multitude of times such that the counter electrode can be installed. In addition, the electric field generated by embedded counter electrodes is localized such that the moisture they can move is limited. The present invention utilizes a counter electrode that is external of the concrete. Thus, the counter electrode can be made to cover a greater surface area, thereby causing moisture from a greater volume of concrete to migrate toward the anode and cathode and allowing better control over the direction of the moisture migration. In addition, counter electrodes that are embedded within the concrete necessarily attract moisture and are thereby corroded and thus are sacrificial. In contrast, the present invention utilizes a counter electrode that is merely in electro-osmotic communication with the concrete; therefore, the corrosion on counter electrode is not utilized as part of the demolition process.

In the present method of concrete demolition, the counter electrode is positioned in electro-osmotic communication with the concrete, preferably in a location similar to the size and shape of the area to be demolished. In this configuration, the electric field would be strongest in the area to be demolished. Therefore, the area to be demolished would incur the most moisture migration and thereby, incur more oxidation of rebar. However, the rebar may transcend the boundaries of the concrete portion to be demolished. In which case, the rebar, adjacent to the demolition boundaries will still attract moisture and suffer oxidation. If oxidation of the rebar outside the demolition boundaries is not desired, then the rebar to be maintained should not come into contact with the rebar of the concrete to be demolished.

The power supply must be able to establish an electric field within the concrete via electrical connections to the rebar and the counter electrode. The power supply requirements will vary with the size of the concrete portion to be demolished. Because the electric field is affected by many factors, such as the distance between the counter electrode and the rebar, the voltage differential necessary to cause the migration of moisture, within and external to the concrete, will vary with the size of the concrete structure. For example, the voltage differential required to induce the migration of moisture in a portion of concrete where the rebar and the counter electrode, are separated by great distances will likely require a greater voltage differential to induce migration of moisture. Optionally, the power supply could allow for easy switching of polarity between the rebar and the counter electrode elements of the invention.

The present invention utilizes the electric field generated within the concrete to migrate the moisture within the concrete. In addition, the present invention may utilize an electrolyte to supplement the available moisture within the concrete. The external electrolyte can be water, or any number of compounds that disassociate into ions in solution.

FIG. 1 illustrates the migration of ions upon the application of an electric field 5. For common building materials that are porous, the walls of the pores (capillaries) are coated with an adsorbed electrically charged moisture. A layer within the capillary walls is created from naturally absorbed moisture from the environment and is known as an electrical double layer. The region of the double layer is electrically neutral as a whole because of its equal number of oppositely charged particles. However, the liquid phase of the absorbed moisture and the walls of the capillaries have different net electrical charges. Therefore, when an electric field is applied to the double layer, the charged particles migrate under the influence of the field. Necessarily, the negative particles move toward the positive pole 10 and positive ions move toward the negative pole 15. In the process of the ions' migration, they drag water molecules with them to the anode or cathode.

The current invention utilizes electric current to induce moisture toward the rebar to necessarily cause oxidation. Because the rebar and the counter electrode are connected to the power supply, an electric field is generated within the concrete block. This electric field causes the ions to pull moisture through the concrete block. Preferably, the rebar acting as the anode would attract negatively charged ions that drag water molecules to the rebar, and expedite the oxidation of the rebar.

Figure 2:
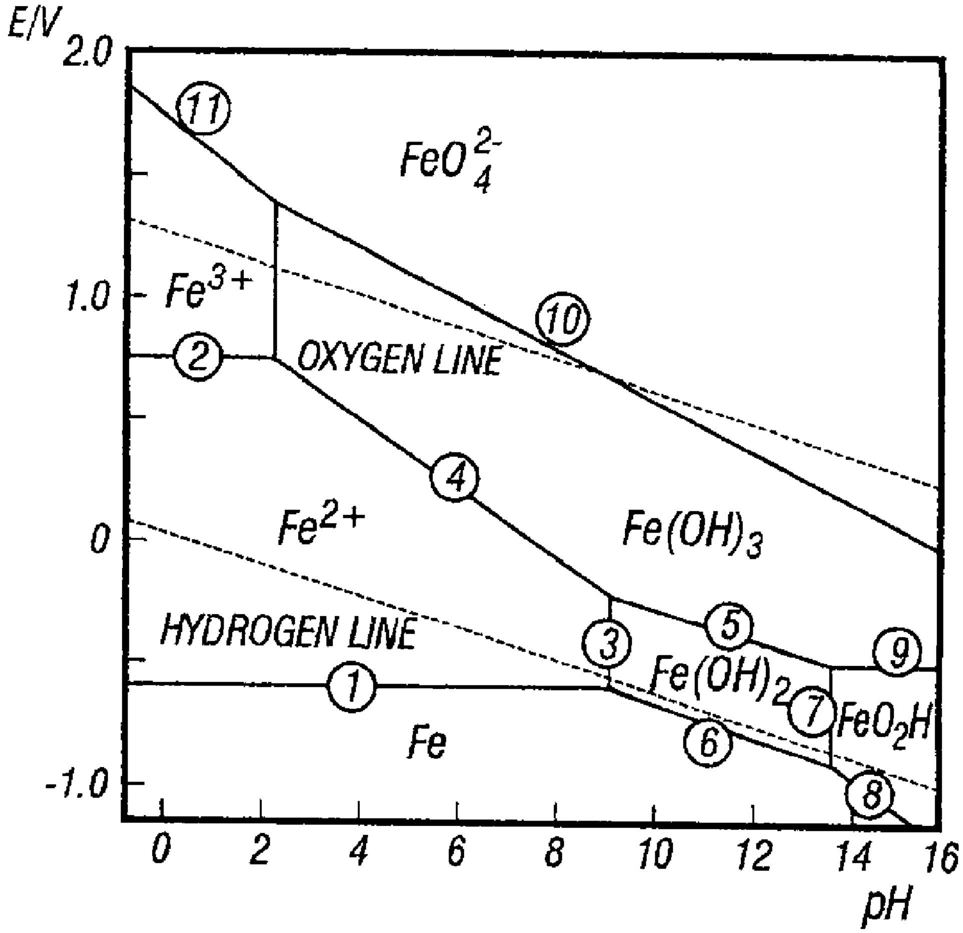
FIG. 2 is a Pourbaix diagram for the reaction of iron in water.

FIG. 2 is a Pourbaix diagram for iron in water that illustrates the redox potential as a function of pH for iron under standard thermodynamic conditions. The diagram takes into account the electrochemical and chemical equilibria and defines the domain stability of the electrolyte (as used in the Pourbaix diagram, water), the iron, and selected compounds. The diagram illustrates that iron will react with, and be oxidized by the electrolyte over the full range of pH values such as between 1 and 16. However, at higher pH values such as between 7 and 16, the oxides formed on the surface of the iron generate a passive layer that prevents further oxidation.

The present invention actively dissolves the iron rebar and reprecipitates the iron as an iron oxide or hydroxide near the rebar, thereby preventing the formation of a passive film. When the moisture migrates to the rebar or anode in the preferred embodiment, the moisture is electrolyzed according to the following reaction:

$$2H_2O \rightarrow O_2 + 4\,H^+ + 4\,e^-$$

to produce protons at the anode. As protons are generated, they lower the pH in the area immediately around the rebar. This accumulation of protons around the rebar causes the formation of the soluble $Fe^{2+}$ species. These $Fe^{2+}$ ions can then migrate toward the cathode and react with the oxygen generated in the electrolysis occurring at the anode or oxygen otherwise present in the concrete pores, to form insoluble iron hydroxide species. Thus, the reprecipitation of the dissolved iron from the rebar forms iron oxide or hydroxide and precludes the formation of passive films that would protect the rebar from further oxidation.

Table 1, illustrates the percentage expansion for different iron oxide species that are formed in the claimed process as compared with pure iron. Because the oxide species occupy a larger volume, areas of localized pressure are formed which can exceed 10,000 psi.

TABLE 1

| Compound | mL/mole Fe | $V_{FeOx}/V_{Fe}$ | Expansion |
|---|---|---|---|
| Fe | 7.105 | — | — |
| FeO | 12.60 | 1.77 | 77.4% |
| $Fe_3O_4$ | 14.84 | 2.09 | 109% |
| $Fe_2O_3$ | 15.41 | 2.17 | 117% |
| FeOOH | 24.34 | 3.43 | 243% |
| $Fe(OH)_2$ | 26.43 | 3.72 | 272% |
| $Fe(OH)_3$ | 29.28 | 4.12 | 312% |

The present invention utilizes the build up of the $Fe^{2+}$ species or compounds to apply stress and cause cracking within the concrete. As described above, the iron oxide species occupy a larger volume than the original rebar and thus create areas of localized pressure. These localized areas of pressure apply stress to the concrete and cause the concrete to fracture. As the reaction continues, more oxide is formed causing the stress cracks to grow larger until the structural integrity of the concrete is lost. In addition, the oxidation of the rebar serves to weaken the rebar's ability to reinforce the concrete.

Figure 3:
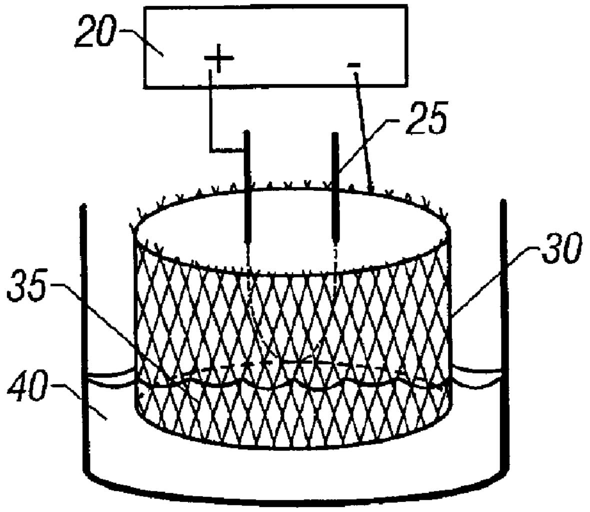
FIG. 3 is a schematic diagram of a test apparatus illustrating the necessary connections between the rebar, counter electrode, and the power supply.

FIG. 3 illustrates one embodiment of the invention, in which a power supply 20 is electrically connected to rebar 25 within a concrete cylinder 35 such that the rebar will act as an anode. The opposite pole of the electrical power supply is connected to a counter electrode 30 that is in electro-osmotic communication with an external surface of the reinforced concrete cylinder 35 while the electrolyte 40 provides a supplemental source of moisture.

EXAMPLE 1

A concrete cylinder 18 cm by 13 cm was prepared using QUIKRETE® fast setting concrete (a trademark of Quikrete Companies, Atlanta, Ga.). A section of 9 mm diameter rebar was bent into a U-shape and inserted into the concrete as it was being poured. The ends of the rebar were left exposed to facilitate the electrical connection of the rebar to the power supply. The cylinder was allowed to harden for three days.

Once hardened, the cylinder was placed into a container wherein an electrolyte, a 5% saline solution, was added until ⅓ of the concrete cylinder was submerged. The counter electrode, an iridium oxide coated titanium mesh (mesh), was juxtaposed on the top and circumference of the concrete cylinder. As is preferable, the rebar was attached to the positive terminal of a power supply (anode) while the mesh was attached to the negative terminal of the power supply (cathode). A constant current of 30 mA was supplied between the two electrodes for a period of two days.

The power supply used was an ISCO® Model 494 Electrophoresis Power Supply (ISCO, Inc. Lincoln, Nebr.). The power supply was chosen because of its ability to operate at high voltages and low currents. Initially, a voltage of 500 volts was applied to the cell. The voltage rapidly increased to 1000 volts for approximately 20 minutes. Subsequently, the voltage dropped to 40 volts. Maintaining a current of 30 mA at this potential requires a power input of only 1.2 Watts.

The voltage pattern occurred because there was already moisture present within the concrete. Once the 30 mA current was supplied to the cell, the moisture within the concrete was oxidized. As the moisture within the concrete was depleted, the electrical resistivity of the concrete increased, thereby forcing the voltage to increase. The resulting higher voltage enhanced the electro-osmotic flow in pulling the externally supplied electrolyte towards the anode. Because the electrolyte was pulled into the concrete cylinder, it filled the void spaces within the concrete cylinder thereby lowering the resistivity throughout the concrete and causing the voltage to drop.

Figure 4:
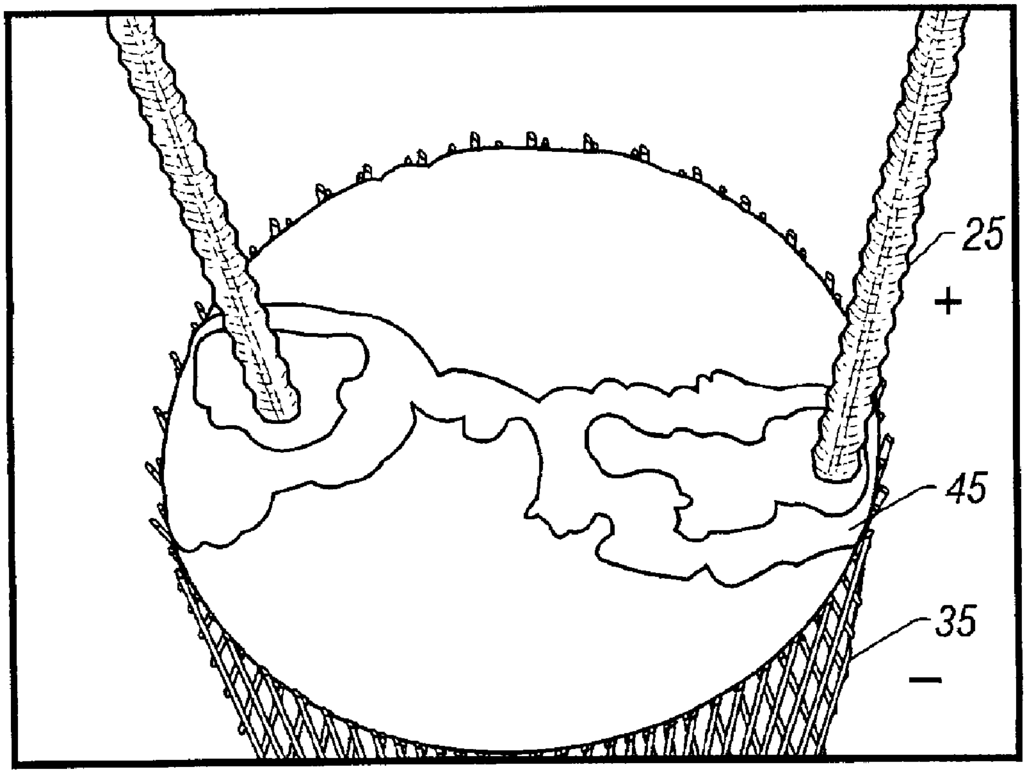
FIG. 4 shows a concrete cylinder after being subjected to 12 hours worth of current provided by the power supply.

FIG. 4 shows the concrete twelve hours after the ISCO® power supply were replaced with the Sorensen® Model DCS600—1.71 (a trademark of Sorensen, a division of Elgar, San Diego, Calif.) power supply. The Sorensen® power supply was electrically connected to the rebar and the mesh. The rebar was connected to the positive side of the power supply, while the mesh was connected to the negative side of the power supply. The current was increased from 30 mA to 1.8 amps. The cell was run for 12 hours with a constant current of 1.8 amps applied to the cell. The increased current produced a much greater reaction within the concrete block. The electrolyte was drawn up into the concrete cylinder 35 as was the iron from the rebar 25, as shown by the pools of electrolyte and precipitated oxide (hydrous iron oxide) 45 formed near the rebar 25. Also, within the concrete cylinder, oxide was building up internally around the rebar causing internal stress within the concrete. As the reaction continued the electrolyte pools of hydrous iron oxide around the rebar became deeper.

Figure 5:
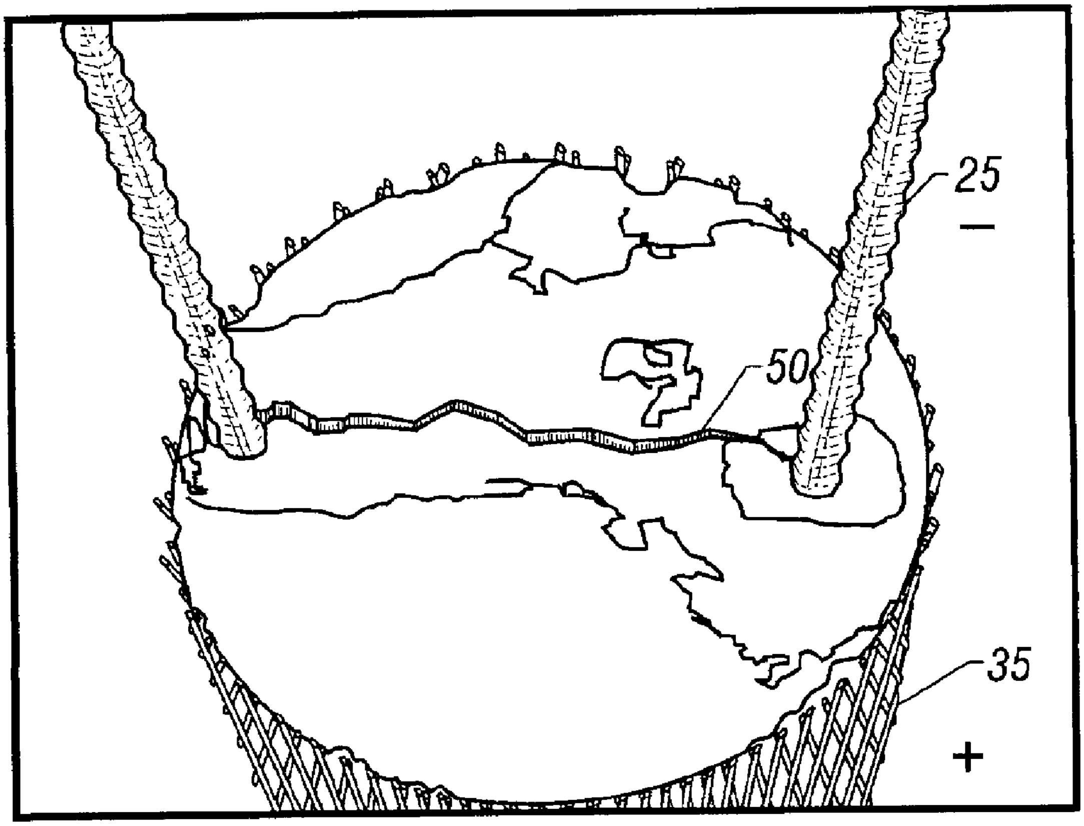
FIG. 5 shows the concrete cylinder after being subjected to another 24 hours of current provided by the power supply.

FIG. 5 shows the concrete cylinder 35 subsequent to 12 hours of increased current (30 mA to 1.8 A), application and the reversing of the polarity of the rebar and mesh. Subsequent to the 12-hour period at 1.8 amps, the polarity of the cell was reversed so that the rebar 25 was connected to the negative side of the power supply while the mesh counter electrode was connected to the positive side of the power supply. Reversing the polarity necessarily caused the extraction of water from the cell. Therefore, the electrolyte pools 45 shown in FIG. 4 containing hydrous iron oxides solidified to form iron oxide deposits. Note that the reversing of the polarity to the original configuration would cause the delivery of additional water, either the water present within the concrete or the electrolyte still remaining, to the surface of the concrete along with additional iron oxide to the surface of the concrete.

Reversing the polarity of the electrodes is a common technique used in the de-watering of porous materials. However, in de-watering applications, an electric field cycle is used rather than a constant electric field. Typically, in the initial stage of the de-watering application, an energy pulse is emitted followed by a much shorter pulse of reverse polarity voltage. Subsequently, a lag phase of no voltage is applied. In contrast, the present invention utilizes a constant electric field to cause the migration of moisture into the concrete block or porous material followed by the oxidation of the rebar within the concrete.

A stress fracture 50 was created due to the expansion of iron oxides formed adjacent to the rebar disposed within the concrete cylinder 35. The application of a light force resulted in the concrete cylinder splitting down the plane of the centerline of the U-shaped rebar. Analysis demonstrated that the rebar had expanded by approximately 40%. The iron oxides had built up around the rebar and caused localized pressure in the region of the rebar. Because these oxides occupied more volume than did the original rebar, stress fractures were created and the structural integrity of the cell was diminished greatly.

Note that the experiment could have utilized a single power supply or several power supplies to achieve the goal of fracturing the concrete. Also, the specified voltages and amperages are merely examples. The same or similar results could be achieved through the use of many different ranges of voltages and amperages. Furthermore, the times specified for the application of the specified voltages and amperages could vary depending on the dimensions of the concrete structure to be demolished, the voltages and amperages applied, and the amount of rebar within the structure.

In accordance with the invention, the concrete to be demolished must be reinforced through the use of reinforcement bar. The reinforcement bar could vary from standard rebar as utilized in the construction industry, to any material containing iron disposed within the concrete. Lastly, the mesh utilized as the cathode in the Examples was an iridium oxide coated titanium mesh selected to minimize the potential required for the reaction. However, the cathode may be made from many other compositions.

While the foregoing is directed to the preferred embodiment of the present invention, other and further embodiments of the invention may be devised without departing form the basic scope thereof, and the scope thereof is determined by the claims which follow.

What is claimed is:

1. A method for demolishing concrete that is reinforced by an iron-containing member comprising:

disposing a counter electrode in electroosmotic communication with an exposed surface of the concrete;

coupling the terminals of a power supply to an exposed portion of the iron-containing member and the counter electrode;

applying a constant electrical potential between the iron-containing member and the counter electrode; and alternating the polarity of the constant electrical potential being applied between the iron-containing member and the counter electrode.

2. The method of claim 1, further comprising:

supplying an electrolyte solution to the surface of the concrete.

3. The method of claim 1, wherein the counter electrode is an iridium-coated titanium mesh.

4. The method of claim 1, wherein the counter electrode comprises iron.

5. The method of claim 1, further comprising:

varying the amount of current supplied from the power supply.

6. The method of claim 1, wherein the counter electrode is not disposed within the concrete.

7. The method of claim 6, wherein the counter electrode is disposed only on the surface of the concrete.

8. The method of claim 7, further comprising:

supplying an electrolyte solution to the surface of the concrete.

9. The method of claim 7, wherein the counter electrode is a metal screen.

10. The method of claim 7, further comprising:

varying the amount of current supplied from the power supply.

* * * * *